United States Patent
Lee et al.

(10) Patent No.: US 12,499,367 B2
(45) Date of Patent: Dec. 16, 2025

(54) ELECTRONIC APPARATUS FOR ARTIFICIAL INTELLIGENCE MODEL COMPRESSION AND METHOD THEREOF

(71) Applicant: Samsung Electronics Co., Ltd., Suwon-si (KR)

(72) Inventors: Dongsoo Lee, Suwon-si (KR); Sejung Kwon, Suwon-si (KR); Byeoungwook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 849 days.

(21) Appl. No.: 16/892,730

(22) Filed: Jun. 4, 2020

(65) Prior Publication Data

US 2021/0027168 A1 Jan. 28, 2021

(30) Foreign Application Priority Data

Jul. 23, 2019 (KR) .................. 10-2019-0089232

(51) Int. Cl.
*G06N 3/084* (2023.01)
*G06N 5/046* (2023.01)
*H03M 7/30* (2006.01)

(52) U.S. Cl.
CPC ............ *G06N 3/084* (2013.01); *G06N 5/046* (2013.01); *H03M 7/3082* (2013.01); *H03M 7/6005* (2013.01); *H03M 7/6011* (2013.01)

(58) Field of Classification Search
CPC ........ G06N 3/084; G06N 5/046; G06N 3/045; G06N 3/044; G06N 3/082; G06N 3/04;
(Continued)

(56) References Cited

U.S. PATENT DOCUMENTS 10,614,361 B2 * 4/2020 Chung ............... G06N 3/084
10,832,138 B2 * 11/2020 Choi .................. G06N 3/082
(Continued)

FOREIGN PATENT DOCUMENTS

CN 106203624 A 12/2016
CN 108304359 A * 7/2018 .......... G06F 40/284
(Continued)

OTHER PUBLICATIONS

Song Han, Xingyu Liu, Huizi Mao, Jing Pu, Ardavan Pedram, Mark A. Horowitz, and William J. Dally. 2016. EIE: efficient inference engine on compressed deep neural network. SIGARCH Comput. Archit. News 44, 3 (Jun. 2016), 243-254, https://doi.org/10.1145/3007787.3001163, (Year: 2016).*

(Continued)

*Primary Examiner* — David Yi
*Assistant Examiner* — Nicholas Shine
(74) *Attorney, Agent, or Firm* — Jefferson IP Law, LLP

(57) ABSTRACT

An electronic apparatus is provided. The electronic apparatus includes a memory configured to store one instruction or more and a processor configured to obtain output data by inputting input data to an artificial intelligence model including a plurality of layers by executing the instruction, and the artificial intelligence model is configured to output the output data based on operation through the plurality of layers and the processor is configured to encode operation data output from one of the plurality of layers and store the encoded operation data in the memory, obtain recovery data corresponding to the operation data by decoding the encoded operation data stored in the memory, and provide the obtained recovery data to another layer from among the plurality of layers.

15 Claims, 7 Drawing Sheets

(58) Field of Classification Search
CPC .. G06N 3/08; G06N 3/06; G06N 5/04; G06N 3/0442; G06N 3/0464; G06N 3/0475; G06N 3/0495; G06N 3/0499; G06N 3/0895; G06N 3/09; G06N 3/091; G06N 3/092; G06N 3/094; G06N 3/096; G06N 3/098; G06N 3/0985; G06N 3/047; G06N 3/0418; G06N 3/043; G06N 7/01; G06N 7/08; G06N 7/02; G06N 3/00; G06N 5/00; G06N 20/00; G06N 3/02; G06N 5/048; H03M 7/3082; H03M 7/6005; H03M 7/6011; H03M 7/6047; H03M 7/3059; H03M 7/30; G06T 15/20; G06T 1/20; H04N 19/154; H04N 19/46; H04N 19/94; G06G 7/60; G06G 7/48; G05B 13/00; G05B 19/00; G05B 17/00; G05B 15/00; G05B 11/00; G06V 30/194; G06V 30/10; G06V 10/70; G06V 10/766; G10L 15/16; G06F 18/00; G06F 18/20; G06F 18/26; G06F 18/27; G06F 18/30; G06F 16/00

See application file for complete search history.

(56) References Cited

U.S. PATENT DOCUMENTS

| | | | |
|---|---|---|---|
| 11,188,813 B2* | 11/2021 | Goudarzi | G06N 3/045 |
| 2016/0155049 A1 | 6/2016 | Choi | |
| 2017/0147921 A1 | 5/2017 | Kasahara | |
| 2017/0177993 A1 | 6/2017 | Draelos et al. | |
| 2018/0101957 A1 | 4/2018 | Talathi | |
| 2018/0131946 A1 | 5/2018 | Lee et al. | |
| 2018/0131953 A1 | 5/2018 | Wang et al. | |
| 2018/0158552 A1 | 6/2018 | Liu et al. | |
| 2018/0253640 A1 | 9/2018 | Goudarzi et al. | |
| 2019/0073594 A1 | 3/2019 | Eriksson et al. | |
| 2019/0096038 A1 | 3/2019 | El-Khamy et al. | |
| 2019/0130249 A1 | 5/2019 | Bradbury et al. | |
| 2019/0138826 A1 | 5/2019 | Ghafarianzadeh et al. | |
| 2019/0197420 A1 | 6/2019 | Singh et al. | |
| 2020/0042218 A1* | 2/2020 | Faibish | G06F 3/0641 |
| 2020/0410326 A1* | 12/2020 | Obukhov | G06N 3/04 |

FOREIGN PATENT DOCUMENTS

| | | |
|---|---|---|
| CN | 109543200 A | 3/2019 |
| JP | 2017-097585 A | 6/2017 |
| KR | 10-2018-0052069 A | 5/2018 |
| KR | 10-1948613 B1 | 2/2019 |
| KR | 10-1951914 B1 | 2/2019 |
| WO | 2019/092459 A1 | 5/2019 |

OTHER PUBLICATIONS

Cao et al., "Constructing method for unsupervised learning unified characteristic extractor", English Translation of CN-108304359-A, Translated by Espacenet (Year: 2023).*

Zhengxue Cheng et al., "Deep Convolutional AutoEncoder-based Lossy Image Compression", 2018 Picture Coding Symposium (PCS), IEEE, Jun. 24, 2018, pp. 253-257, XP033398631.

Anonymous, "Autoencoder—Wikipedia", Jul. 12, 2019, pp. 1-12, XP055892643, URL: https://en.wikipedia.org/w/index.php?title=Autoencoder&oldid=905990949.

Extended European Search Report dated Mar. 4, 2022, issued in European Patent Application No. 20843822.6-1207.

International Search Report and Written Opinion dated Aug. 24, 2020, issued in International Patent Application No. PCT/KR2020/006351.

European Examination Report dated Oct. 5, 2023; European Appln. No. 20 843 822.6-1207.

Chinese Office Action with English translation dated Oct. 30, 2024; Chinese Appln. No. 202080039397.9.

Chinese Office Action dated Mar. 6, 2025, issued in a Chinese Patent Application No. 202080039397.9.

Korean Office Action dated Apr. 28, 2025, issued in a Korean Patent Application No. 10-2019-0089232.

Chinese Office Action dated May 9, 2025, issued in a Chinese Patent Application No. 202080039397.9.

European Communication pursuant to Article 94(3) EPC dated Jun. 5, 2025; European Appln. No. 20 843 822.6-1218.

Chinese Office Action with English translation dated Jul. 23, 2025; Chinese Appln. No. 202080039397.9.

* cited by examiner

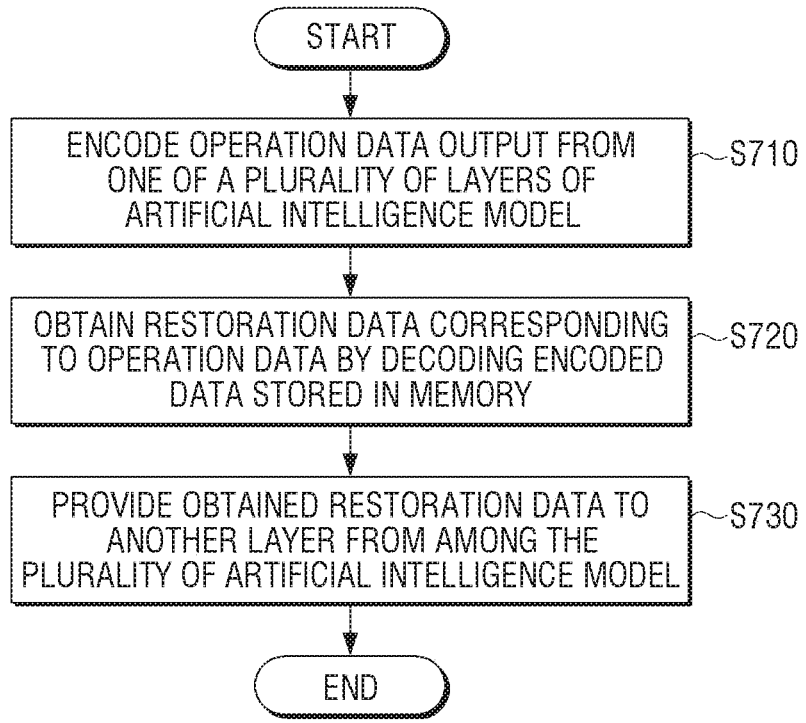

ELECTRONIC APPARATUS FOR ARTIFICIAL INTELLIGENCE MODEL COMPRESSION AND METHOD THEREOF

CROSS-REFERENCE TO RELATED APPLICATION(S)

This application is based on and claims priority under 35 U.S.C. § 119(a) of a Korean patent application number 10-2019-0089232, filed on Jul. 23, 2019, in the Korean Intellectual Property Office, the disclosure of which is incorporated by reference herein in its entirety.

BACKGROUND

1. Field

The disclosure relates to an electronic apparatus and a controlling method thereof. More particularly, the disclosure relates to an electronic apparatus that operates based on an artificial intelligence technology and a controlling method thereof.

2. Description of Related Art

Recently, an artificial intelligence system that implements human-level intelligence has been developed. The artificial intelligence system is a system in which unlike the existing rule-based smart system, a machine learns and makes a determination by itself, and is used in various areas such as voice recognition, image recognition and future prediction. In particular, recently, an artificial intelligence system that solves a given problem based on deep learning has been developed.

Meanwhile, in order to implement an artificial intelligence technology through an artificial intelligence model, it is necessary to store in a memory operation data output based on the operation of parameters and input data of the artificial intelligence model.

Here, the parameters of the artificial intelligence model is a weight of each layer of the artificial intelligence model, and since it is a fixed value after learning, it may be referred to as static data. Further, the operation data output based on the operation of input data is a value output by each layer of the artificial intelligence model, and since it is a value determined by the input data, it may be referred to as dynamic data.

Meanwhile, a technology for compressing the above-described fixed data through a method such as quantization has been developed but currently, no technology has been developed with respect to compression of dynamic data.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for an electronic apparatus that operates based on an artificial intelligence technology and a controlling method thereof Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a memory configured to store one instruction or more and a processor configured to obtain output data by inputting input data to an artificial intelligence model including a plurality of layers by executing the instruction, and the artificial intelligence model is configured to output the output data based on operation through the plurality of layers and the processor is configured to encode operation data output from one of the plurality of layers and store the encoded operation data in the memory, obtain recovery data corresponding to the operation data by decoding the encoded operation data stored in the memory, and provide the obtained recovery data to another layer from among the plurality of layers.

In accordance with another aspect of the disclosure, a controlling method of an electronic apparatus is provided. The controlling method includes encoding operation data output from one of a plurality of layers of an artificial intelligence model and storing the encoded operation data in a memory, obtaining restoration data corresponding to the operation data by decoding the encoded operation data stored in the memory, and providing the obtained restoration data to another layer from among the plurality of layers.

A computer readable recording medium storing at least one instruction according to an embodiment executes the instruction to cause an electronic apparatus to encode operation data output from one of a plurality of layers of an artificial intelligence model and store the encoded operation data in a memory, obtain restoration data corresponding to the operation data by decoding the encoded operation data stored in the memory, and provide the obtained restoration data to another layer from among the plurality of layers Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a flowchart provided to explain a controlling method of an electronic apparatus according to an embodiment of the disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Further, in case it is determined that in describing embodiments, detailed explanation of related known functions or configurations may unnecessarily obscure the gist of the disclosure, the detailed explanation will be abbreviated or omitted.

In addition, embodiments of the disclosure will be described in detail with reference to the accompanying drawing and the contents described in the accompanying drawings, but the disclosure is not limited thereto.

Hereinafter, the disclosure will be described in detail with reference to accompanying drawings.

The disclosure aims at providing an electronic apparatus capable of compressing and storing operation data, that is, dynamic data output by each layer of an artificial intelligence model and a controlling method thereof.

Figure 1:
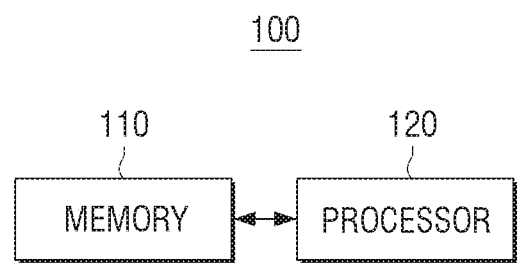
FIG. 1 is a block diagram provided to explain an electronic apparatus according to an embodiment of the disclosure.

FIG. 1 is a block diagram provided to explain an electronic apparatus according to an embodiment of the disclosure.

Referring to FIG. 1, an electronic apparatus 100 according to an embodiment includes a memory 110 and a processor 120.

The electronic apparatus 100 according to an embodiment is an apparatus that obtains output data regarding input data using an artificial intelligence model, and the electronic apparatus 100 may be, for example, a desktop personal computer (PC), a notebook PC, a smartphone, a tablet PC, a server, and the like. Alternatively, the electronic apparatus 100 may be a system itself in which a cloud computing environment is established. However, the electronic apparatus 100 is not limited thereto, and may be any apparatus capable of performing operation using an artificial intelligence model.

The memory 110 is provided separately from the processor 120, and may be implemented as a hard disc, a non-volatile memory, a volatile memory, and the like. Here, the non-volatile memory may be one time programmable read only memory (OTPROM), programmable ROM (PROM), erasable and programmable ROM (EPROM), electrically erasable and programmable ROM (EEPROM), mask ROM, flash ROM, etc., and the volatile memory may be dynamic random access memory (DRAM), static RAM (SRAM) or synchronous dynamic RAM (SDRAM), etc. The memory 110 may be implemented as at least one of ROM (not illustrated) or RAM (not illustrated) in the processor 120.

The memory 110 is accessed by the processor 120, and reading/recording/modifying/deleting/updating, etc. of data may be performed by the processor 120.

The memory 110 may store an artificial intelligence model. Here, the artificial intelligence model may be a model trained through an artificial intelligence algorithm.

The artificial intelligence model may be composed of a plurality of layers. Here, each layer may include one or more nodes (or neurons), and each node may be assigned at least one weight.

As such, the artificial intelligence model may be a model based on a neural network. For example, the artificial intelligence model may be a model based on a Recurrent Neural Network (RNN). Here, the RNN refers to a cyclic neural network, and is a kind of a deep learning model for learning data that changes over time such as time series data.

However, the artificial intelligence model is not limited thereto, and the artificial intelligence model may be a model based on various networks such as Convolutional Neural Network (CNN), Deep Neural Network (DNN), Restricted Boltzmann Machine (RBM), Deep Belief Network (DBN), Bidirectional Recurrent Deep Neural Network (BRDNN), and the like. In addition, the memory 110 may store a model which is generated based on a rule rather than a model which is trained through an artificial intelligence algorithm, and there is no specific limit to a model stored in the memory 110.

The processor 120 controls the overall operations of the electronic apparatus 100. To do so, the processor 120 may be composed of one or a plurality of processors. Here, one or a plurality of processors may be a general-purpose processor such as a central processing unit (CPU), an application processor (AP), or a communication processor (CP). One or a plurality of processors may also be a processor dedicated for graphics such as a graphics processing unit (GPU) or a processor dedicated for artificial intelligence such as a neural network processing unit (NPU).

The processor 120 may perform the operations of the electronic apparatus 100 according to various embodiments of the disclosure by executing at least one instruction stored in the memory 110. For example, the processor 120 may obtain output data regarding input data using an artificial intelligence model including a plurality of layers by executing at least one instruction. Here, the input data may be a text, an image, a user voice, and the like. For example, the text may be a text input through an input unit (not illustrated) such as a keyboard, a touch pad, etc. of the electronic apparatus 100, and the image may be an image photographed through a camera of the electronic apparatus 100. The user voice may be a user voice input through a microphone of the electronic apparatus 100. However, this is only an example, and the processor 120 may obtain input data in various ways. For example, the processor 120 may receive an image from an external device such as a server, or may receive a user voice from an external device such as a remote controller. In addition, the above-described input data may be, for example, various types of data such as weather data, stock data, etc. for a predetermined period of time.

Meanwhile, the output data may vary depending on the type of input data and/or artificial intelligence model. In other words, the output data may be different depending on which input data is input to which artificial intelligence model. For example, if the artificial intelligence model of the disclosure is a model for language translation, the processor 120 may obtain output data represented in the second language with respect to the input data represented in the first language. Alternatively, if the artificial intelligence model of the disclosure is a model for image analysis, the processor 120 may input an image as input data of the artificial intelligence model and obtain information regarding an object detected from the corresponding image as output data. For example, if an image including a puppy is input as input data, the processor 120 may obtain information that the corresponding image is an image including a puppy as output data. If the artificial intelligence model of the disclosure is a model for image analysis, the processor 120 may input an image as input data of the artificial intelligence model and obtain a text representing the corresponding image as a word as output data. For example, if an image of a boy holding an apple is input as input data, the processor 120 may obtain the text, 'a boy is picking an apple', as output data. If the artificial intelligence model of the disclosure is a model for voice recognition, the processor 120 may input a user voice as input data and obtain a text corresponding to the user voice as output data. Meanwhile, the above-described output data is an example, and the types of output data of the disclosure is not limited thereto.

When input data is input, the processor 120 may represent the input data as a vector (a matrix or tensor). Here, the method of representing the input data as a vector (a matrix or tensor) may vary depending on the type of the input data. For example, if a text (or a text converted from a user voice) is input as input data, the processor 120 may represent the text as a vector through One hot Encoding, or represent the text as a vector through Word Embedding. Here, the One hot encoding is a method in which only the value of the index of a specific word is represented as 1 and the value of the remaining index is represented as 0, and the Word Embedding is a method in which a word is represented as a real number in the dimension (e.g., 128 dimensions) of a vector set by a user. As an example of the Word Embedding method, Word2Vec, FastText, Glove, etc. may be used. Meanwhile, if an image is input as input data, the processor 120 may represent each pixel of the image as a matrix. For example, the processor 120 may represent each pixel of an image as a value of 0 to 255 for each red, green, and blue (RGB) color, or represent the image as a matrix with a value achieved dividing the value represented as 0 to 255 by a preset number (e.g., 255).

The processor 120 may perform an operation with respect to input data represented as a vector (a matrix or tensor) using an artificial intelligence model.

For example, if an artificial intelligence model is composed of an input layer, a hidden layer and an output layer, the input layer may include information regarding input data which is represented as a vector (a matrix or tensor). In this case, the processor 120 may output the operation data of the input data by calculating a weight between the input layer and the hidden layer read from the memory 110 in the vector (or the matrix or the tensor) of the input data. Here, bias may be further considered, but for convenience of explanation, the bias will be omitted in the description. In addition, the processor 120 may perform an operation by using the operation data of the input layer as the input of the hidden layer. Specifically, the processor 120 may output the operation data of the input layer and the operation data of the hidden layer by performing an operation based on a weight between the hidden layer and the output layer read from the memory 110. The processor 120 may obtain output data using the operation data of the hidden layer as the input of the output layer. Specifically, the processor 120 may output output data by applying a predetermined function (e.g., a softmax function) to the operation data of the hidden layer. Here, the output data, as described above, may be a text in a language different from an input text input as the input data if an artificial intelligence model is a model for language translation, and may be data including information regarding an object included in an image if an artificial intelligence model is a model for image analysis. However, the output data is not limited thereto. Meanwhile, if an artificial intelligence model of the disclosure is a model including a plurality of hidden layers, the operation data output in the previous hidden layer may be input data of the next hidden layer.

The processor 120 may store operation data of each layer of an artificial intelligence model in the memory 110. This is because in the stage training the artificial intelligence model, operation data for updating a weight of each layer is required in the stage of back propagation for minimizing an error of the artificial intelligence model, and in the stage of inference after training the artificial intelligence model, operation data of the previous layer is required in order to perform an operation of the next layer. For example, if an artificial intelligence model of the disclosure is a Recurrent Neural Network (RNN), the processor 120 may store in the memory 110 operation data output based on input data of the previous time point, in order to use the operation data in the process of outputting operation data of input data of the next time point. In addition, if an artificial intelligence model of the disclosure is a Convolutional Neural Network (CNN), the processor 120 may store in the memory 110 operation data (i.e., a feature map) generated by performing convolutional operation processing with respect to the previous layer, in order to use the operation data for an operation of the next layer.

Meanwhile, the operation data is data determined based on data input to each layer as described above and thus, may be referred to as dynamic data, intermediate data or activation.

Meanwhile, when the operation data is stored in the memory 110 as described above, there may be a problem that the capacity of the memory is exceeded in a mobile device such as a smart phone having a limited memory.

In order to resolve such a problem, the processor 120 may encode (or compress) operation data and store the same in the memory 110, which will be explained with reference to FIG. 2.

Figure 2:
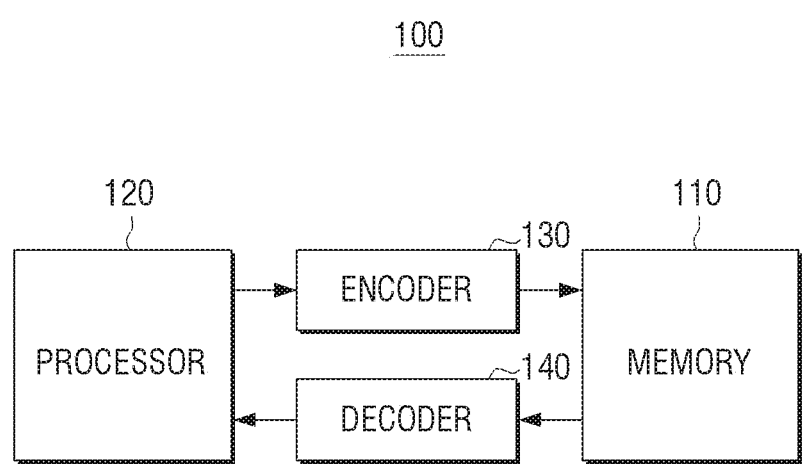
FIG. 2 is a detailed block diagram provided to explain an electronic apparatus according to an embodiment of the disclosure.

FIG. 2 is a detailed block diagram provided to explain an electronic apparatus according to an embodiment of the disclosure.

Referring to FIG. 2, the electronic apparatus 100 according to an embodiment may include the memory 110, an encoder 130, a decoder 140, and the processor 120. Hereinafter, the overlapping description will be omitted or abbreviated.

The processor 120 is connected to one or more component composing the electronic apparatus 100 and controls the overall operations of the electronic apparatus 100. Specifically, the processor 120 is connected at least one of the memory 110, the encoder 130 or the decoder 140 to control the operation of each component.

The processor 120 may obtain input data. For example, the processor 120 may obtain not only a text input through an input unit (not illustrated) such as a keyboard or a touch pad of the electronic apparatus 100 as input data but also an image photographed through a camera of the electronic apparatus 100 as input data. In addition, the processor 120 may obtain a user voice input through a microphone of the electronic apparatus 100 as input data.

The processor 120 may represent input data as a vector (a matrix or tensor according to an embodiment). Here, the method of representing input data as a vector (a matrix or tensor) may be different depending on the type of input data. For example, if a text of 'I am a boy' is obtained as input data, the processor 120 may represent 'I' as [1, 0, 0, 0], 'am' as [0, 1, 0, 0], 'a' as [0, 0, 0, 1], and 'boy' as [0, 0, 0, 1] through one hot encoding. Alternatively, the processor 120 may represent 'I' as [0.1, 4.2, 1.5, 2.8], 'am' as [1.0, 3.1, 2.5, 1.1], 'a' as [0.3, 2.1, 0.9, 1.1], and 'boy' as [0.7, 1.7, 0.5, 0.2] through word embedding. If an image is obtained as input data, the processor 120 may represent the image as a matrix in M*N form (here, M and N can be not only different integers but also the same integer) based on the RGB values of each pixel.

The processor 120 may perform an operation with respect to input data represented in a vector (a matrix or tensor) using an artificial intelligence model. For example, if an artificial intelligence model is composed of an input layer, a hidden layer and an output layer, the input layer may include information regarding the input data represented in a vector (a matrix or tensor). In this case, the processor 120 may output operation data of the input layer by calculating a weight between the input layer and the hidden layer read from the memory 110.

In this case, the operation may be a deep learning operation in the form of $y=M*x$ (herein, M refers to a vector, a matrix or tensor representing a weight read from the memory 110, x refers to a vector, a matrix or tensor representing input data, and y refers to a vector, a matrix or tensor representing operation data). For example, if the input data is [x1; x2] and a weight read from the memory 110 is [w11, w12; w21, w22], the operation data may be [w11*x1+w12*x2; w21*x1+w22*x2]. To this end, the processor 120 may include processing element (PE) that performs an operation of data, and may be connected to an interface of the memory 110.

The processor 120 may perform the operation of storing operation data in the memory 110.

In particular, the processor 120 may encode operation data and store the same in the memory 110. As described above, the operation data of an artificial intelligence model may be represented as a vector, a matrix or tensor, and such a vector, a matrix or tensor is the subject of encoding of the disclosure.

To this end, the processor 120 may be connected to the encoder 130 as illustrated in FIG. 2. The processor 120 may transmit operation data generated based on a deep learning operation to the encoder 130.

The encoder 130 may encode operation data output by the processor 120. Here, encoding refers to the compression of the operation data, and the encoder 130 may convert the operation data into or represent the operation data as data smaller than the operation data through encoding.

According to an embodiment, the operation data may be converted into or represented as data having a dimension lower than that of the operation data through encoding. In other words, if the operation data is an n-dimensional vector (a matrix or tensor), the encoder 130 may convert the operation data into or represent the operation data as a vector (a matrix or tensor) having a dimension lower than n. For example, if operation data output through the above-described deep learning is represented as a 4-dimensional vector such as [0.7, 1.7, 0.5, 0.2], the encoder 130 may represent the operation data of [0.7, 1.7, 0.5, 0.2] as a 3-dimensional vector such as [0.5, 1.5, 0.4].

To this end, when operation data is received from the processor 120, the encoder 130 may read a weight for encoding the operation data from the memory 110.

Specifically, when the operation data of Layer n is received from the processor 120, the encoder 130 may read a weight corresponding to Layer n from the memory 110. Here, the weight corresponding to Layer n means a weight learned to encode the operation data of Layer n. The learning of an artificial intelligence model of the disclosure will be described later with reference to FIG. 4.

The encoder 130 may encode the operation data of Layer n by performing a deep learning operation based on the operation data received from the processor 120 and the weight read from the memory 110. In other words, the encoder 130 may convert or represent the operation data of Layer n represented as an n-dimensional vector (a matrix or tensor) into or as a vector (a matrix or tensor) having a dimension lower than n.

Subsequently, the encoder 130 may store the encoded data in the memory 110. To do so, the encoder 130 may be connected to the memory 110 as illustrated in FIG. 2.

Meanwhile, it has been described above that operation data based on the input data and the weight of the hidden layer is encoded, but this is only an example. If an artificial intelligence model of the disclosure includes a plurality of hidden layers, the processor 120 may encode operation data based on the output data (corresponding to the input data of the second hidden layer) of the first hidden layer and the weight of the second hidden layer through the encoder 130. The operation data to be encoded may be not only output data of the previous layer but also data where the activation function (e.g., ReLu, sigmiod) of the current layer is applied to the output data of the previous layer.

The decoder 140 may decode encoded data stored in the memory 110.

Decoding means the restoration of encoded data, and the decoder 140 may restore encoded data to data corresponding to data before encoding. Here, the data corresponding to data before encoding means data that approximates the data before encoding, and may not be completely identical to the data before encoding, but may be data that can be regarded as reconstructing data before encoding.

According to an embodiment, the encoded data stored in the memory 110 may be data encoded by the encoder 130, that is, the operation data output by the processor 120 being converted into or represented as data having a low dimension by the encoder 130. In this case, the decoder 140 may obtain restoration data corresponding to the above-described operation data by decoding the encoded data stored in the memory 110.

Here, the restoration data corresponding to the operation data is data that approximates the operation data output by the processor 120, and may not be completely identical to the operation data, but may be data that can be regarded as reconstructing data of the operation data.

According to an embodiment, encoded data may be converted into or represented as data having a dimension higher than that of the encoded data through decoding. In other words, if encoded data is an n-dimensional matrix, the decoder 140 may convert or represent the encoded data into or as a matrix having a dimension higher than n. For example, if data encoded by the encoder 130 is represented as a 3-dimensional vector such as [0.5, 1.5, 0.4], the decoder 140 may represent the encoded data of [0.5, 1.5, 0.4] as a 4-dimensional vector such as [0.7, 1.7, 0.5, 0.2].

To do so, the decoder 140 may read encoded data stored in the memory 110 and a weight for decoding the encoded data from the memory 110. In addition, the decoder 140 may decode the encoded data by performing a deep learning operation with respect to the encoded data and weight read from the memory 110. In other words, the decoder 140 may restore the encoded data represented in a n-dimensional matrix to a matrix having a dimension higher than n. To this end, the decoder 140 may be connected to the memory 110 as illustrated in FIG. 2.

Subsequently, the decoder 140 may transmit the decoded data obtained through decoding to the processor 120. To do so, the decoder 140 may be connected to the processor 120 as illustrated in FIG. 2.

Then, the processor 120 may perform an operation using the decoded data received from the decoder 140, which will be described later with reference to FIG. 3.

As such, the disclosure may effectively implement an artificial intelligence model in a memory with limited capacity by encoding operation data and storing the same in the memory.

Meanwhile, in FIG. 2, the memory 110, the processor 120, the encoder 130, and the decoder 140 are illustrated as separate components, but this is only an example. For example, the encoder 130 and the decoder 140 may be included in the memory 110. In this case, the encoder 130 may perform encoding of operation data output by the processor 120 inside the memory, and may perform the operation of storing the encoded data in the memory 110. The decoder 140 may perform decoding of the data encoded by the encoder 130 inside the memory 110. Accordingly, the disclosure may remove or reduce power consumption caused by transmission/reception of data between the encoder 130 and the memory 110 and power consumption caused by transmission/reception of data between the decoder 140 and the memory 110.

In addition, the encoder 130 and the decoder 140 may be included in the processor 120. In this case, the encoder 130 may perform encoding of operation data generated by the processor 120 inside the processor, and the decoder 140 may perform decoding of data encoded by the encoder 130 inside the processor 120. Accordingly, the disclosure may remove or reduce power consumption caused by transmission/reception of data between the encoder 130 and the processor 120 and power consumption caused by transmission/reception of data between the decoder 140 and the processor 120.

In addition, the processor 120, the encoder 130 and the decoder 140 may be included in the memory 110. In this case, the processor 120 may perform a series of operations for obtaining output data from input data inside the memory 110, and store operation data generated as the result of the operations in the memory 110. The encoder 130 may perform encoding of operation data generated by the processor 120 inside the memory 110, and the decoder 140 may perform decoding of data encoded by the encoder 130 inside the memory 110.

Figure 3:
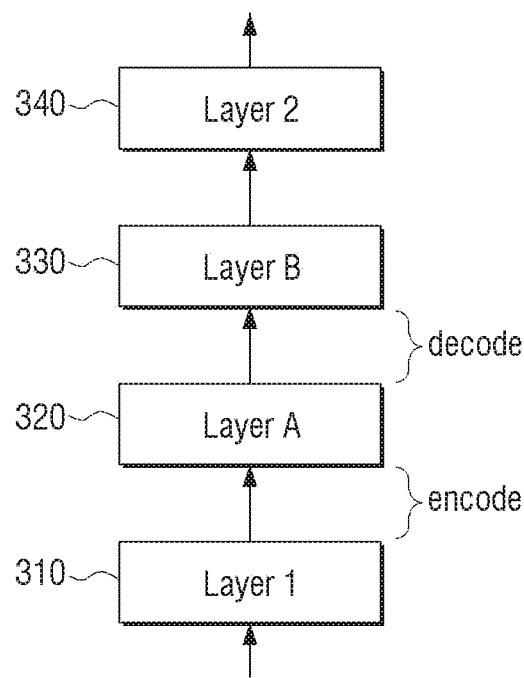
FIG. 3 is a view provided to explain an embodiment in which output data is generated using encoded data according to an embodiment of the disclosure.

FIG. 3 is a view provided to explain an embodiment in which output data is generated using encoded data according to an embodiment of the disclosure.

An artificial intelligence model according to an embodiment may include an input layer for inputting input data, an output layer for outputting output data and a plurality of hidden layers which are located between the input layer and the output layer and output operation data based on a deep learning operation.

In particular, referring to FIG. 3, an artificial intelligence model according to an embodiment may further include a first hidden layer 320 including encoded data encoding operation data output by a specific layer 310 (the specific layer may be one of a plurality of hidden layers as well as an input layer) and a second hidden layer 330 including decoded data decoding the encoded data of the first hidden layer 320. Here, the first hidden layer 320 may be referred to as an encoding layer, and the second hidden layer 330 may be referred to as a decoding layer. The encoded data included in the first hidden layer 320 may be stored in the memory 110 as described above. If an artificial intelligence model according to an embodiment is implemented as a Convolutional Neural Network (CNN), the processor 120 may encode operation data (i.e., a feature map) that is generated by performing convolutional operation processing with respect to the previous layer (not illustrated) through the encoder 130 and store the same in the memory 110. The processor 120 may obtain decoded data by restoring the encoded data for the operation of the next layer 340 and perform an operation based on the decoded data and the weight of the next layer 340.

Alternatively, if an artificial intelligence model according to an embodiment is a Recurrent Neural Network (RNN), the processor 120 may encode operation data output based on the input data of the previous time point (t−1) through the encoder 130 and store the same in the memory 110. In the operation of outputting operation data of the input data of the present time point (t), the processor 120 may output the operation data by considering the decoded data generated by restoring the encoded data stored in the memory together with the input data at the present time point.

Meanwhile, although FIG. 3 illustrates one encoding layer and one decoding layer, there may be a plurality of encoding layers and decoding layers according to an embodiment.

Figure 4:
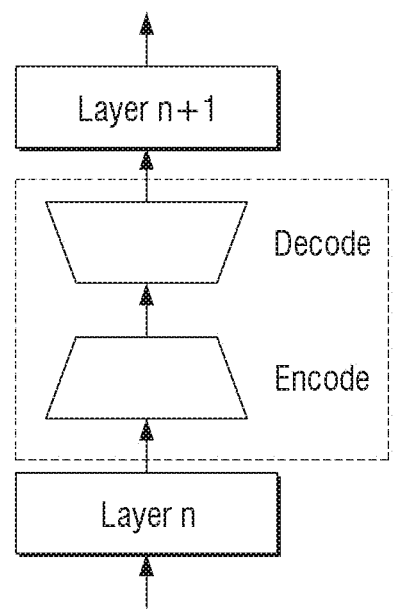
FIG. 4 is a view provided to explain a learning method of an artificial intelligence model according to an embodiment of the disclosure.

FIG. 4 is a view provided to explain a learning method of an artificial intelligence model according to an embodiment of the disclosure.

Referring to FIG. 4, an artificial intelligence model according to an embodiment may include a plurality of layers. The artificial intelligence model may further include a first hidden layer (not illustrated) for encoding of operation data and a second hidden layer (not illustrated) for decoding encoded data. Here, the first hidden layer may be relatively lower than the dimension of Layer n, and the second hidden layer may be the same as the dimension of Layer n.

For example, an artificial intelligence model according to an embodiment may include the first hidden layer for encoding the operation data of Layer n between Layer n and Layer n+1 and the second hidden layer for decoding the encoded data of the first hidden layer. As such, the disclosure is characterized in that encoding and decoding are performed between some of a plurality of layers constituting an artificial intelligence model.

Meanwhile, in an artificial intelligence model according to an embodiment, a plurality of encodings and decodings may be performed between a plurality of layers. Hereinafter, for convenience of explanation, it is assumed that the artificial intelligence model includes the first hidden layer for encoding and the second hidden layer for decoding.

The artificial intelligence model including the first and second hidden layers between Layer n and Layer n+1 may learn the weights of the first and second hidden layers so as to generate the second hidden layer that reconstructs Layer n.

Specifically, the artificial intelligence model may learn the weights of the first and second hidden layers so as to reconstruct the data of Layer n into a layer having fewer nodes than the number of nodes (or neurons) of Layer n.

For example, if the first and second hidden layers are added between Layer n and Layer n+1, the artificial intelligence model may output the output data of the first hidden layer based on the operation data of Layer n (i.e., the output data of Layer n) and the operation of the weight of the first hidden layer, output the output data of the first hidden layer, and output the output data of the second hidden layer based on the output data of the first hidden layer and the operation of the weight of the second hidden layer. In addition, the artificial intelligence model may learn the weights of the first and second hidden layers so that the error between the output data of Layer n and the output data of the second hidden layer is minimized.

According to an embodiment, an artificial intelligence of the disclosure may have a structure similar to an auto-encoder. The auto-encoder is an artificial intelligence model that performs learning to output data similar to input data, and for example, if encoding and decoding are performed between Layer n and Layer n+1, the first and second hidden layers of the disclosure may be trained to output data similar to the data output from Layer n, which is similar to the auto-encoder. However, the auto-encoder is different from the artificial intelligence model of the disclosure in that the auto-encoder itself exists as an artificial intelligence model, but the encoding and decoding of the disclosure are performed only between some of a plurality of layers of an artificial intelligence model.

Meanwhile, learning of the artificial intelligence model may be performed through learning of the entire system including the first and second hidden layers. In this case, the artificial intelligence model may perform learning such that errors of the entire system including the first and second hidden layers are minimized. Here, the learning may be performed through general Forward Propagation and Back Propagation and thus, detailed description is omitted.

As described above, by learning the entire system including the plurality of layers and, the first and second hidden layers added between some of the plurality of layers, the artificial intelligence model of the disclosure may obtain the weights of the plurality of layers and the weights of the first and second hidden layers at once.

Meanwhile, this is only an example, and the disclosure may learn the first and second hidden layers independently. For example, if the first and second hidden layers are added between Layer n and Layer n+1, the disclosure may set the operation data of Layer n as the input of the first hidden layer and set the operation data of Layer n as the output of the second hidden layer. In addition, by learning the weights of the first and second hidden layers to reconstruct the data of the Layer n with a size relatively smaller than the data size of Layer n, the weights of the first and second hidden layers may be obtained.

Accordingly, when operation data is received from the processor 120, the encoder 130 may perform encoding using the received operation data based on the learned weight. In addition, the decoder 140 may perform decoding using the encoded data stored in the memory 110 based on the learned weight.

Meanwhile, in case where the first and second hidden layers are added while learning of a plurality of layers that do not include the first and second hidden layers is completed, the artificial intelligence model according to an embodiment may further learn the weights of the first and second hidden layers.

In this case, the artificial intelligence model may fix the weights of the plurality of layers of which learning is completed. In other words, the artificial intelligence model may fix the weights of the plurality of layers of which learning is completed, and perform learning such that the errors of the entire system including the first and second hidden layers are minimized.

Accordingly, the disclosure may selectively add the first and second hidden layers to the artificial intelligence model depending on whether compression is required.

Figure 5:
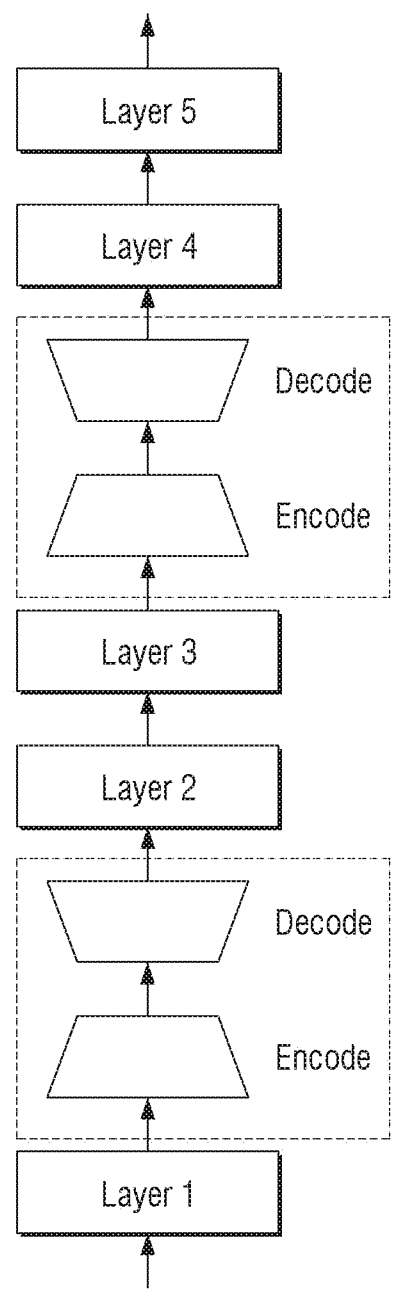
FIG. 5 is a view provided to explain a plurality of encodings and a plurality of decodings according to an embodiment of the disclosure.

FIG. 5 is a view provided to explain a plurality of encodings and a plurality of decodings according to an embodiment of the disclosure.

An artificial intelligence model according to an embodiment may perform a plurality of encodings and a plurality of decodings.

Referring to FIG. 5, the artificial intelligence model may include the first hidden layer (not illustrated) and the second hidden layer (not illustrated) between the first and second layers and the third hidden layer (not illustrated) and the fourth hidden layer (not illustrated) between the third and fourth layers. Here, the first hidden layer may be a layer for encoding operation data of the first layer, and the second hidden layer may be a layer for decoding the encoded data of the first hidden layer. The third hidden layer may be a layer for encoding operation data of the third layer, and the fourth hidden layer may be a layer for decoding the encoded data of the third hidden layer.

Each of the first to fourth hidden layers included in the artificial intelligence model may be trained to generate an output layer that reconstructs the previous layer. For example, in the above-described embodiment, the first and second hidden layers may be trained to reconstruct the first layer and the third and fourth hidden layers may be trained to reconstruct the third layer.

In this case, the encoder 130 according to an embodiment may be implemented in plural. In other words, the electronic apparatus 100 according to an embodiment may include a first encoder (not illustrated) for encoding output data of the first layer using the weight of the first hidden layer and a second encoder (not illustrated) for encoding output data of the third layer using the weight of the third hidden layer.

Likewise, the decoder 140 according to an embodiment may be implemented in plural. In other words, the electronic apparatus 100 according to an embodiment may include a first decoder (not illustrated) for decoding the data encoded by the first encoder (not illustrated) using the weight of the second hidden layer and a second decoder (not illustrated) for decoding the data encoded by the second encoder (not illustrated) using the weight of the fourth hidden layer.

This is considering that the feature of each layer may be different and accordingly, the weight for encoding and the weight for decoding may be different for each layer. Thus, the disclosure may encode and decode various data through a plurality of encoders and a plurality of decoders.

Meanwhile, an artificial intelligence model according to an embodiment may perform learning so that a plurality of hidden layers for encoding share weights and a plurality of hidden layers for decoding share weights.

Specifically, the artificial intelligence model may learn so that the first and third hidden layers have the same weight and the second and fourth hidden layers have the same weight by sharing the weights of the first and third hidden layers and sharing the weights of the second and fourth hidden layers. In this case, in the operation of performing learning, the artificial intelligence model may update the values of the weights of the first and third hidden layers so that the first and third hidden layers have the same weight, and update the values of the weights of the second and fourth hidden layers so that the second and fourth hidden layers have the same weight.

Accordingly, the electronic apparatus 100 according to an embodiment may encode output data of different layers through one encoder 130. Likewise, the electronic apparatus 100 according to an embodiment may decode data encoded in different layers through one decoder 140.

Thus, comparing with the case of including a plurality of encoders and a plurality of decoders, the disclosure may be implemented in the electronic apparatus 100 having a relatively small size. In addition, by sharing weights, the time required for learning can be reduced.

Figure 6:
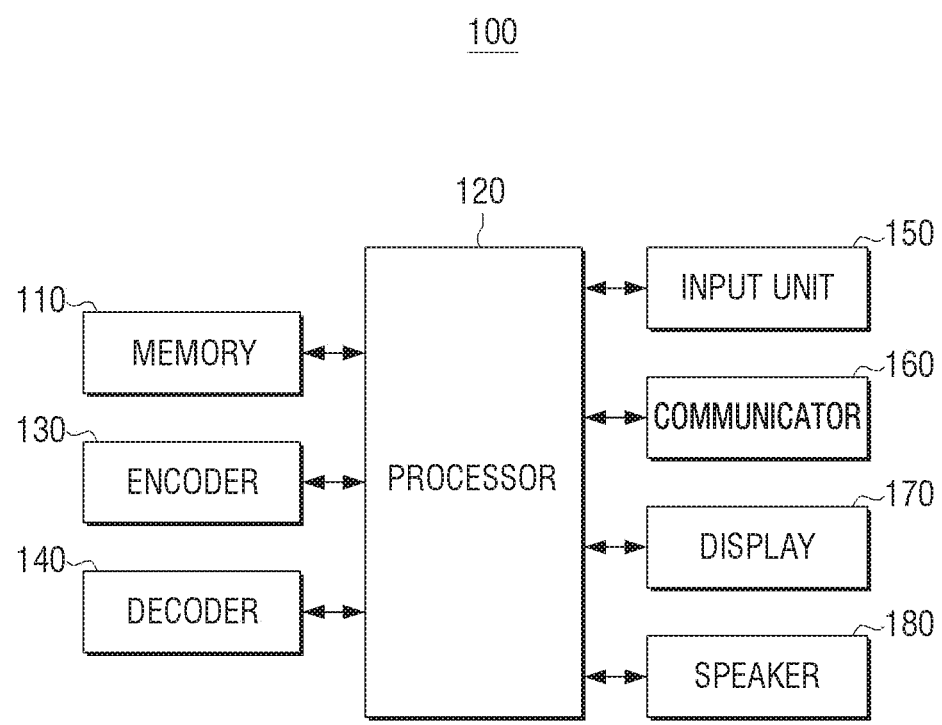
FIG. 6 is a detailed block diagram provided to explain an electronic apparatus according to an embodiment of the disclosure.

FIG. 6 is a detailed block diagram provided to explain an electronic apparatus according to an embodiment of the disclosure.

Referring to FIG. 6, the electronic apparatus 100 according to an embodiment may include the memory 110, the encoder 130, the decoder 140, an input unit 150, a communicator 160, a display 170, a speaker 180, and a processor 120. Hereinafter, the overlapping description will be omitted or abbreviated.

The input unit 150 may receive a user command. To do so, the input unit 150 may include a touch sensor, a (digital) pen sensor, a pressure sensor, or a key. The touch sensor may use at least one of, for example, a captive manner, a resistive manner, an infrared manner, or an ultrasonic manner. The (digital) pen sensor may be, for example, a part of the touch panel or may include a separate sheet for recognition. The key may be, for example, a physical button, an optical key, or a keypad. The input unit 150 may include a microphone. Here, the microphone may receive a user's uttered voice.

The communicator 160 may transmit/receive various data by performing communication with an external device. Specifically, the communicator 160 may receive an artificial intelligence model by performing communication with an external device. Here, the artificial intelligence model may be not only a model including layer for encoding and a layer for decoding but also a model without a layer for encoding and a layer for decoding. In the latter case, the electronic apparatus 100 may add a layer for encoding and a layer for decoding to the artificial intelligence model, and train an artificial intelligence model including a layer for encoding and a layer for decoding.

In addition, the communicator 160 may receive various data for generating an artificial intelligence model by performing communication with an external device.

To do so, the communicator 160 may include a wireless communication chip, a Wi-Fi chip, a Bluetooth chip, etc.

The display 170 may display various screens. In particular, the display 170 may display a screen corresponding to output data output by an artificial intelligence model. Here, the screen corresponding to output data may be a message, an image, etc. generated based on the output data.

The display 170 may be implemented with various display technologies such as Liquid Crystal Display (LCD), Organic Light Emitting Diodes (OLED), Active-Matrix Organic Light-Emitting Diode (AM-OLED), Liquid Crystal on Silicon (LcoS), Digital Light Processing (DLP), or so. In addition, the display 170 may be connected to at least one of a front area, a side area, or a rear area of the electronic apparatus 100 in the form of a flexible display.

In addition, the display 170 may be implemented as a touch screen with a touch sensor.

The speaker 180 is configured to output various audio data for which various processing works such as decoding, amplification, and noise filtering have been performed by an audio processor (not illustrated). In addition, the speaker 180 may output various alarm sounds or voice messages. According to an embodiment, when the learning of an artificial intelligence model is completed or output data is output by an artificial intelligence model, the speaker 180 may output alarm sounds, etc.

FIG. 7 is a flowchart provided to explain a controlling method of an electronic apparatus according to an embodiment of the disclosure.

The electronic apparatus 100 according to an embodiment may encode operation data output from one of a plurality of layers of an artificial intelligence model and store the encoded data in the memory at operation S710. Specifically, the electronic apparatus 100 may encode operation data output from one of a plurality of layers of an artificial intelligence model through an encoder, and store the encoded data in the memory 110.

The electronic apparatus 100 may obtain restoration data corresponding to operation data by decoding encoded data stored in the memory 110 (at operation S720). Specifically, the electronic apparatus 100 may obtain restoration data corresponding to operation data by decoding encoded data through a decoder. As such, the disclosure may implement an artificial intelligence technology effectively even in a mobile device with limited memory, etc. through compression of dynamic data.

The electronic apparatus 100 may provide the obtained restoration data to another one of the plurality of layers of the artificial intelligence model at operation S730. Accordingly, the output layer of the artificial intelligence model may generate output data based on the operation data of the previous layer and the restoration data.

According to various embodiments as described above, an artificial intelligence technology can be implemented effectively even in a mobile device with limited memory through compression of dynamic data.

Meanwhile, the above-described methods according to various embodiments may be implemented only by software/hardware upgrade for an existing electronic apparatus.

In addition, the above-described various embodiments may be performed by an embedded server provided in an electronic apparatus or an external server.

The controlling method of an electronic apparatus according to the above-described various embodiments may be implemented as a program and stored in various recording media. In other words, a computer program that is processed by various processors and executes the above-described various controlling methods may be stored in a recording medium and used therein.

The non-transitory computer-readable medium refers to a medium that stores data semi-permanently, and is readable by a device, but not a medium that stores data for a short moment such as a register, a cache, and a memory. Specifically, the above-described various applications or programs may be stored in a non-transitory computer-readable medium such as a compact disc (CD), a digital versatile disc (DVD), a hard disk, a blue-ray disc, a USB, a memory card, a ROM and the like and provided therein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
memory configured to store one instruction or more; and
at least one processor configured to obtain output data by inputting input data to an artificial intelligence model including a plurality of layers by executing the one instruction or more,
wherein the artificial intelligence model is configured to output the output data based on operation through the plurality of layers,
wherein the one instruction or more, when executed by the at least one processor causes the electronic apparatus to:
determine, based on a capacity of the memory, that compression of data output from a first layer of the artificial intelligence model is required in case of the data being stored in the memory without compression and being provided to a second layer of the artificial intelligence model after retrieval from the memory,
add a first hidden layer and a second hidden layer between the first layer and the second layer based on the determination, wherein the first hidden layer has a dimension that is lower than that of the first layer, and the second hidden layer has a dimension that is equal to that of the first layer,
encode operation data output from the first layer without the operation data having been or being stored in the memory, based on a weight of the first hidden layer retrieved from the memory when the operation data is output from the first layer, and store the encoded operation data in the memory,
retrieve the encoded operation data and a weight of the second hidden layer from the memory, and obtain restoration data corresponding to the operation data by decoding, based on the weight of the second hidden layer that is retrieved from the memory, the encoded operation data that is retrieved from the memory, and
provide the obtained restoration data to the second layer without the obtained restoration data having been or being stored in the memory,
wherein the artificial intelligence model is configured to learn the weight of the first hidden layer and the weight of the second hidden layer so as to reconstruct data of the first layer into a layer having fewer nodes than a number of nodes of the first layer,
wherein the artificial intelligence model is further configured to learn the weight of the first hidden layer and the weight of the second hidden layer so that an error between the operation data output by the first layer and the obtained restoration data output by the second hidden layer is minimized,
wherein the artificial intelligence model is further configured to, based on the first hidden layer and the second hidden layer being added after learning that of a subset of the plurality of layers, which does not include the first hidden layer and the second hidden layer, is completed, obtain the weight of the first hidden layer and the weight of the second hidden layer through learning of an entire system including the subset of the plurality of layers, the first hidden layer, and the second hidden layer while fixing weights of the plurality of layers, and
wherein the learned weight of the first hidden layer and the weight of the second hidden layer are stored in the memory.

2. The electronic apparatus as claimed in claim 1, wherein the artificial intelligence model is further configured to obtain the weight of the first hidden layer and the weight of the second hidden layer through learning of an entire system including the plurality of layers, the first hidden layer, and the second hidden layer.

3. The electronic apparatus as claimed in claim 1, wherein the plurality of layers include a third layer, and a third hidden layer, and a fourth hidden layer between the second layer and the third layer, and
wherein the artificial intelligence model is further configured to:
learn a weight of the third hidden layer and a weight of the fourth hidden layer to generate the fourth hidden layer that reconstructs the second layer, and
learn so that the first hidden layer and the third hidden layer have a same weight, and the second hidden layer and the fourth hidden layer have a same weight.

4. The electronic apparatus as claimed in claim 3, wherein the one instruction or more, when executed by the at least one processor, further causes the electronic apparatus to:
perform encoding of the operation data and encoding of input data of the third hidden layer through one encoder, and
perform decoding of the encoded operation data and decoding of input data of the fourth hidden layer through one decoder.

5. A method performed by an electronic apparatus, the method comprising:
determining, based on a capacity of a memory, that compression of data output from a first layer of an artificial intelligence model including a plurality of layers is required in case of the data being stored in the memory without compression and being provided to a second layer of the artificial intelligence model after retrieval from the memory;
adding a first hidden layer and a second hidden layer between the first layer and the second layer based on the determination, wherein the first hidden layer has a dimension that is lower than that of the first layer, and the second hidden layer has a dimension that is equal to that of the first layer;
encoding, operation data output from the first layer without the operation data having been or being stored in the memory, based on a weight of the first hidden layer retrieved from the memory when the operation data is output from the first layer, and storing the encoded operation data in the memory;
retrieving the encoded operation data and a weight of the second hidden layer from the memory, and obtaining restoration data corresponding to the operation data by decoding, based on the weight of the second hidden layer that is retrieved from the memory, the encoded operation data that is retrieved from the memory; and
providing the obtained restoration data to the second layer without the obtained restoration data having been or being stored in the memory,
wherein the artificial intelligence model is configured to learn the weight of the first hidden layer and the weight of the second hidden layer so as to reconstruct data of the first layer into a layer having fewer nodes than a number of nodes of the first layer, wherein the artificial intelligence model is further configured to learn the weight of the first hidden layer and the weight of the second hidden layer so that an error between the operation data output by the first layer and the obtained restoration data output by the second hidden layer is minimized, wherein the artificial intelligence model is further configured to, based on the first hidden layer and the second hidden layer being added after learning of a subset of the plurality of layers, which does not include the first hidden layer and the second hidden layer, is completed, obtain the weight of the first hidden layer and the weight of the second hidden layer through learning of an entire system including the subset of the plurality of layers, the first hidden layer, and the second hidden layer while fixing weights of the plurality of layers, and wherein the learned weight of the first hidden layer and the weight of the second hidden layer are stored in the memory.

6. The method as claimed in claim 5, wherein the artificial intelligence model is further configured to obtain the weight of the first hidden layer and the weight of the second hidden layer through learning of an entire system including the plurality of layers, the first hidden layer, and the second hidden layer.

7. The method as claimed in claim 5,
wherein the plurality of layers include a third layer, and a third hidden layer, and a fourth hidden layer between the second layer and the third layer, and
wherein the artificial intelligence model is further configured to:
learn a weight of the third hidden layer and a weight of the fourth hidden layer to generate the fourth hidden layer that reconstructs the second layer; and
learn so that the first hidden layer and the third hidden layer have a same weight, and the second hidden layer and the fourth hidden layer have a same weight.

8. The method as claimed in claim 7, further comprising:
performing encoding of the operation data and encoding of input data of the third hidden layer through one encoder; and
performing decoding of the encoded operation data and decoding of input data of the fourth hidden layer through one decoder.

9. A non-transitory computer readable recording medium storing at least one instruction that, when executed by at least one processor of an electronic apparatus, cause an electronic apparatus to perform operations to:
determine, based on a capacity of a memory, that compression of data output from a first layer of an artificial intelligence model including a plurality of layers is required in case of the data being stored in the memory without compression and being provided to a second layer of the artificial intelligence model after retrieval from the memory;
add a first hidden layer and a second hidden layer between the first layer and the second layer based on the determination, wherein the first hidden layer has a dimension that is lower than that of the first layer, and the second hidden layer has a dimension that is equal to that of the first layer;

encode operation data output from the first layer without the operation data having been or being stored in the memory, based on a weight of the first hidden layer retrieved from the memory when the operation data is output from the first layer, and store the encoded operation data in the memory;
retrieve the encoded operation data and a weight of the second hidden layer from the memory, and obtain restoration data corresponding to the operation data by decoding, based on the weight of the second hidden layer that is retrieved from the memory, the encoded operation data that is retrieved from the memory; and
provide the obtained restoration data to the second layer without the obtained restoration data having been or being stored in the memory,
wherein the artificial intelligence model is configured to learn the weight of the first hidden layer and the weight of the second hidden layer so as to reconstruct data of the first layer into a layer having fewer nodes than a number of nodes of the first layer,
wherein the artificial intelligence model is further configured to learn the weight of the first hidden layer and the weight of the second hidden layer so that an error between the operation data output by of the first layer and the obtained restoration data output by the second hidden layer is minimized,
wherein the artificial intelligence model is further configured to, based on the first hidden layer and the second hidden layer being added after learning of a subset of the plurality of layers, which does not include the first hidden layer and the second hidden layer, is completed, obtain the weight of the first hidden layer and the weight of the second hidden layer through learning of an entire system including the subset of the plurality of layers, the first hidden layer, and the second hidden layer while fixing weights of the plurality of layers, and
wherein the learned weight of the first hidden layer and the weight of the second hidden layer are stored in the memory.

10. The non-transitory computer readable recording medium of claim 9, wherein the encoded operation data is encoded in a vector having one dimension less than a vector including the operation data.

11. The non-transitory computer readable recording medium of claim 10, wherein the vector including the operation data comprises a same number of dimensions as a vector including the restoration data.

12. The non-transitory computer readable recording medium of claim 9, wherein the artificial intelligence model is received from an external device without the first hidden layer and without the second hidden layer.

13. The non-transitory computer readable recording medium of claim 9, wherein at least two layers of the plurality of layers of the artificial intelligence model do not include a hidden layer therebetween.

14. The electronic apparatus as claimed in claim 1, wherein at least two layers of the plurality of layers of the artificial intelligence model do not include a hidden layer therebetween.

15. The method as claimed in claim 5, wherein at least two layers of the plurality of layers of the artificial intelligence model do not include a hidden layer therebetween.

* * * * *